United States Patent [19]

Tan

[11] Patent Number: 5,075,824
[45] Date of Patent: Dec. 24, 1991

[54] LCD/LIGHT WEDGE MODULE

[75] Inventor: Jin H. Tan, Johor Bahru, Malaysia

[73] Assignee: Motorola, Inc., Schaumburg, Ill.

[21] Appl. No.: 516,633

[22] Filed: Apr. 30, 1990

[51] Int. Cl.⁵ .............................. F21V 5/00; G02F 1/13
[52] U.S. Cl. ....................................... 362/31; 362/23; 362/26; 362/30; 359/48
[58] Field of Search ................ 362/23, 26, 27, 29, 362/30, 31, 28, 32; 350/345; 40/546

[56] References Cited

U.S. PATENT DOCUMENTS

| | | | |
|---|---|---|---|
| 3,561,145 | 2/1971 | Shotwell | 362/26 |
| 4,017,155 | 4/1977 | Yapi et al. | 350/345 |
| 4,229,783 | 10/1980 | Eberhardt | 362/23 |
| 4,407,481 | 12/1984 | Suzawa | 350/345 |
| 4,573,766 | 3/1986 | Bournay, Jr. et al. | 362/26 |
| 4,799,133 | 1/1989 | Strzalko et al. | 362/26 |
| 4,929,062 | 5/1990 | Guzik et al. | 362/31 |
| 4,954,930 | 9/1990 | Maegawa et al. | 362/26 |

Primary Examiner—Ira S. Lazarus
Assistant Examiner—D. M. Cox
Attorney, Agent, or Firm—Pablo Meles; Eugene A. Parsons

[57] ABSTRACT

An LCD/light wedge module used in electronic equipment includes an LCD unit engaged in a central opening, which is sealed to prevent dust from entering. The light wedge module is constructed of light conducting material that is formed to direct light off a back surface and through the LCD unit to a front viewing surface to prevent hot spots.

7 Claims, 3 Drawing Sheets

LCD/LIGHT WEDGE MODULE

The present invention pertains to an LCD/light wedge module for use in electronic equipment and more particularly to a light wedge module constructed to solve hot spot, dust and mounting problems.

BACKGROUND OF THE INVENTION

As is well known in the art, a liquid crystal display (LCD) is a low power device in which material in liquid suspension is aligned by the influence of an applied voltage. In most cases the material operates similar to a light switch or gate to block the passage of light through the device or to allow it to pass. A number of devices are combined to form alphanumeric characters and a number of alphanumeric characters are combined to form a display unit. Generally a light source is mounted behind the unit so as to direct light through the unit to provide the correct illumination. Several problems arise from this configuration.

The light source and LCD unit are generally combined in such a way as to allow the accumulation of dust and dirt therebetween. This accumulated dust will substantially lower the illumination, and the efficiency, of the display. Further, the light source is generally situated to emit light directly through the LCD unit, which produces variations in light intensity across the display. These variations in light intensity are referred to in the art as "hot spots", and are reduced by painting and the like to diffuse the light more evenly. Such painting requires much additional work and is highly susceptible to scratches or uneven coatings of paint. Finally, LCD units are susceptible to breakage in electronics equipment and especially in portable equipment, such as pagers, portable radios and telephones.

SUMMARY OF THE INVENTION

It is an object of the present invention to provide a new and improved LCD/light wedge module.

It is a further object of the present invention to provide a new and improved LCD/light wedge module which is constructed to prevent dust and dirt from entering therein.

It is a further object of the present invention to provide a new and improved LCD/light wedge module constructed to substantially eliminate hot spots.

It is a further object of the present invention to provide a new and improved LCD/light wedge module with mounting structure which substantially reduces breakage due to impacts and the like.

These and other objects of the invention are realized in an LCD/light wedge module including a light wedge constructed of light conducting material having a planar viewing surface, a slot defined by said light wedge for receiving an LCD therein and at least one light receiving area positioned to direct received light into the light conducting material, through an LCD sealed in the slot and onto the planar viewing surface and means sealing an LCD in the slot.

Further, the LCD/light wedge module may incorporate a mounting groove formed in the light wedge with resilient material positioned therein for engaging edges of the housing of an electronic device.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
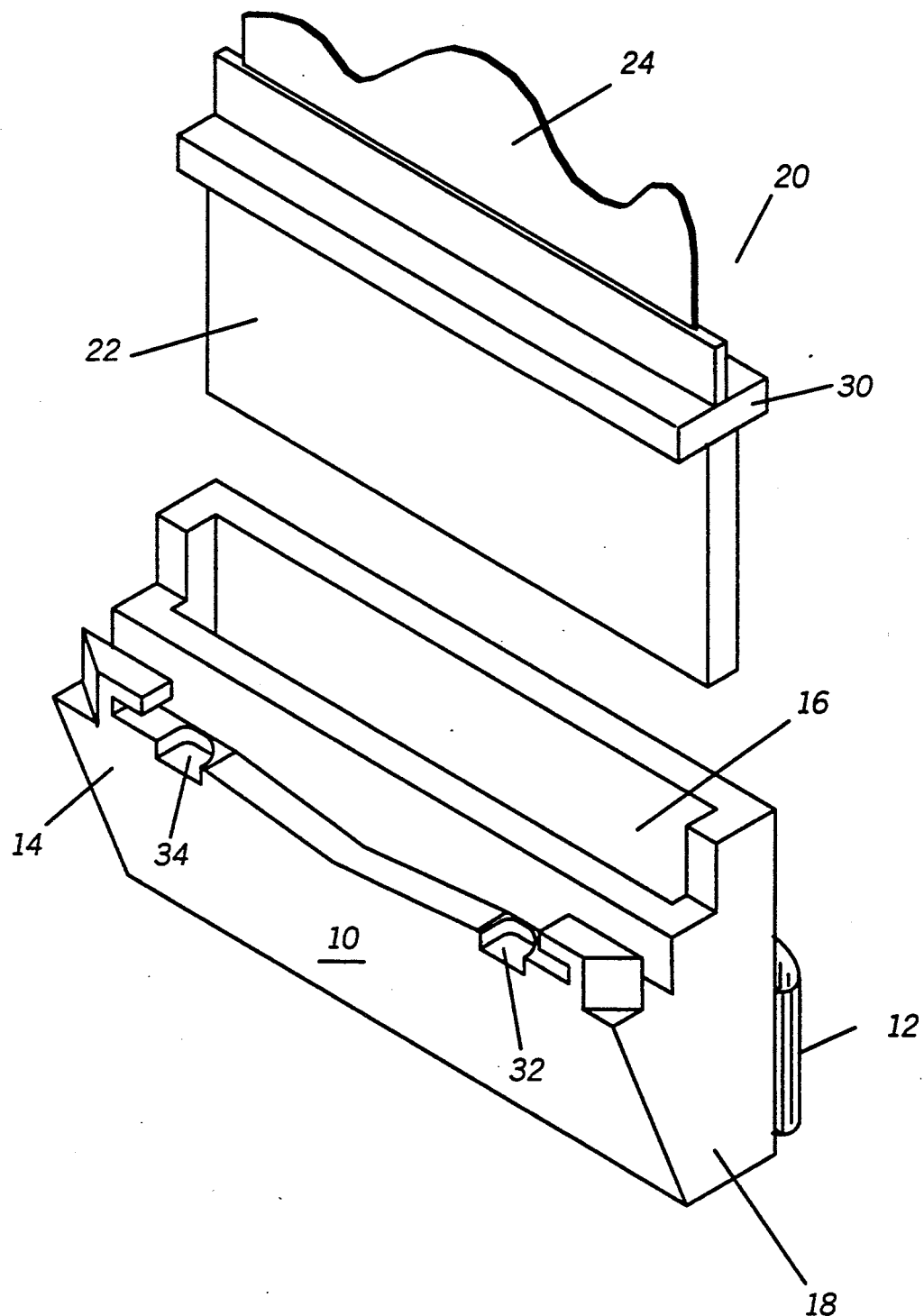
FIG. 1 is an exploded view in perspective of an LCD/light wedge module, portions thereof removed, incorporating the present invention.

Referring specifically to FIG. 1, portions of an LCD/light wedge module embodying the present invention are illustrated. In particular, a light wedge 10 constructed of light conducting material is formed with a substantially rectangular planar viewing surface 12, a rear surface 14 slanted at an angle with respect to viewing surface 12 and a generally box shaped pocket, or slot, 16 formed between surface 12 and surface 14. Slot 16 is formed to receive a similarly shaped LCD unit 20 nestingly engaged therein. LCD unit 20 includes a commercially available LCD 22 having a flex lead 24 operatively attached thereto in a well known manner.

A strip of resilient material 30, which may be for example foam rubber, is affixed to encircle LCD unit 20 adjacent the connection of LCD 22 and flex lead 24. When LCD unit 20 is nestingly positioned in slot 16, resilient material 30 engages the sides and/or edges of slot 16 and substantially seals slot 16 to prevent entry therein of dust, dirt, and the like. Resilient material 30 may also be used in retain LCD 22 within slot 16 if desired. It will be understood by those skilled in the art that other methods and/or apparatus might be utilized to seal and/or retain LCD 22 in slot 16, if convenient or desirable. For example, the LCD manufacturer could place the LCD in a light wedge and seal it with plastic material at the factory. Thus, the LCD and light wedge would be incorporated into a substantially integral unit by the manufacturer.

Figure 2:
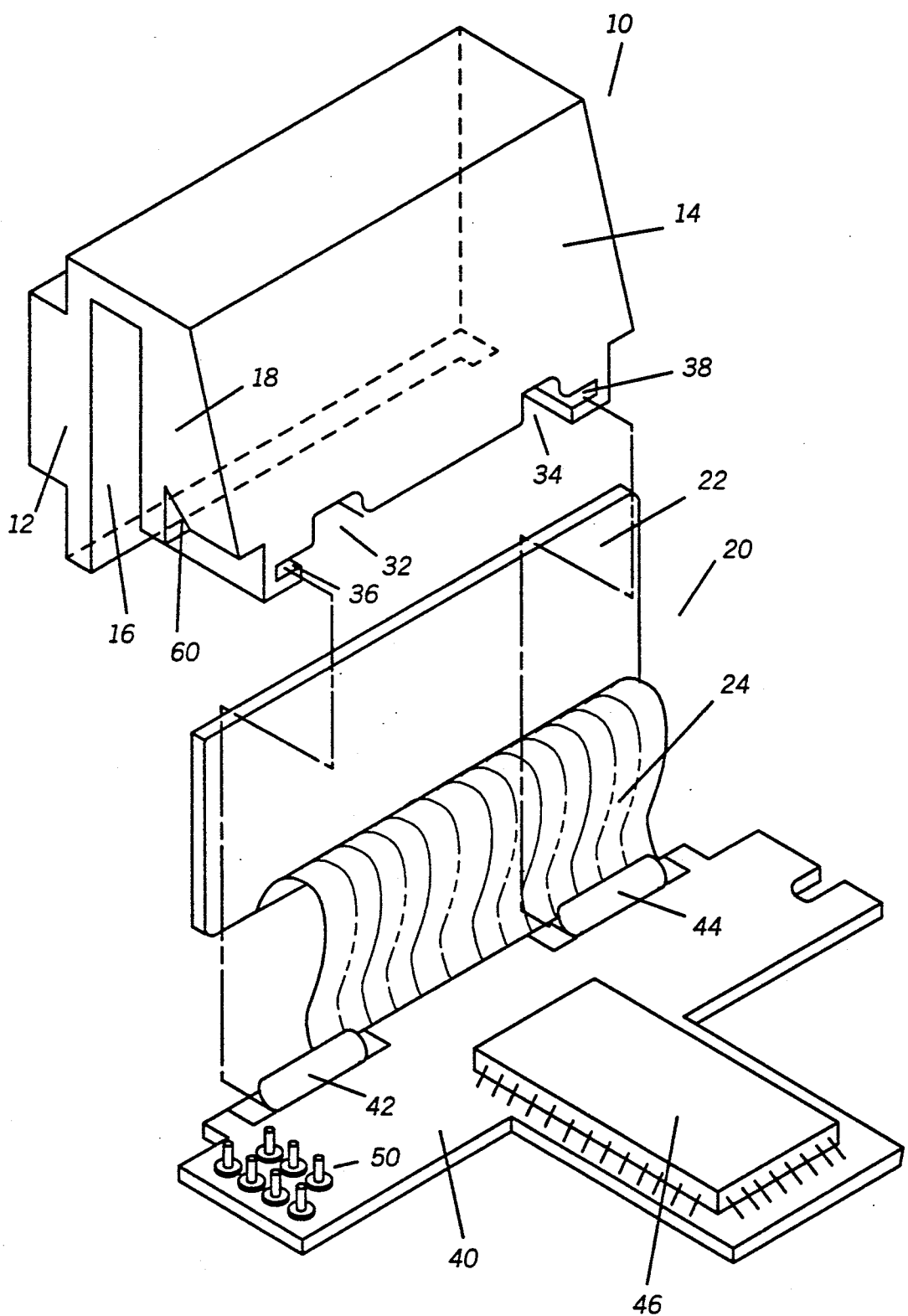
FIG. 2 is an inverted view of the structure in FIG. 1, further illustrating attached circuitry, with portions thereof broken away and shown in section.

Referring to FIG. 2, an inverted view of light wedge 10 and LCD unit 20 is illustrated. One end of light wedge 10 is broken away and shown in section to clarify the construction thereof. From the section, it can be seen that slot 16 has substantially planar opposed sides that are generally parallel with viewing surface 12. Also, the rear planar surface of slot 16 and the slanted rear surface 14 of light wedge 10 form a generally wedge shaped portion 18 of light conducting material. A pair of lamp receiving areas, which in this embodiment are openings 32 and 34, are formed in the large edge of wedge shaped portion 18. Slots 36 and 38 are also formed in light wedge 10 adjacent openings 32 and 34 for receiving a circuit board 40 slideably engaged therein.

Circuit board 40 has a pair of lamps 42 and 44 mounted thereon so as to fit within openings 32 and 34 when circuit board 40 is properly engaged in slots 36 and 38. Circuit board 40 also has an LCD decoder 46 mounted thereon and coupled through flex lead 24 to LCD 22. External control signals can be supplied to decoder 46 through a connector, such as that shown at 50, for example. With LCD 22 engaged in slot 16 and circuit board 40 engaged in slots 36 and 38, a complete LCD/light wedge module is formed, which may be utilized as an LCD display in electronic equipment and the like.

Figure 3:
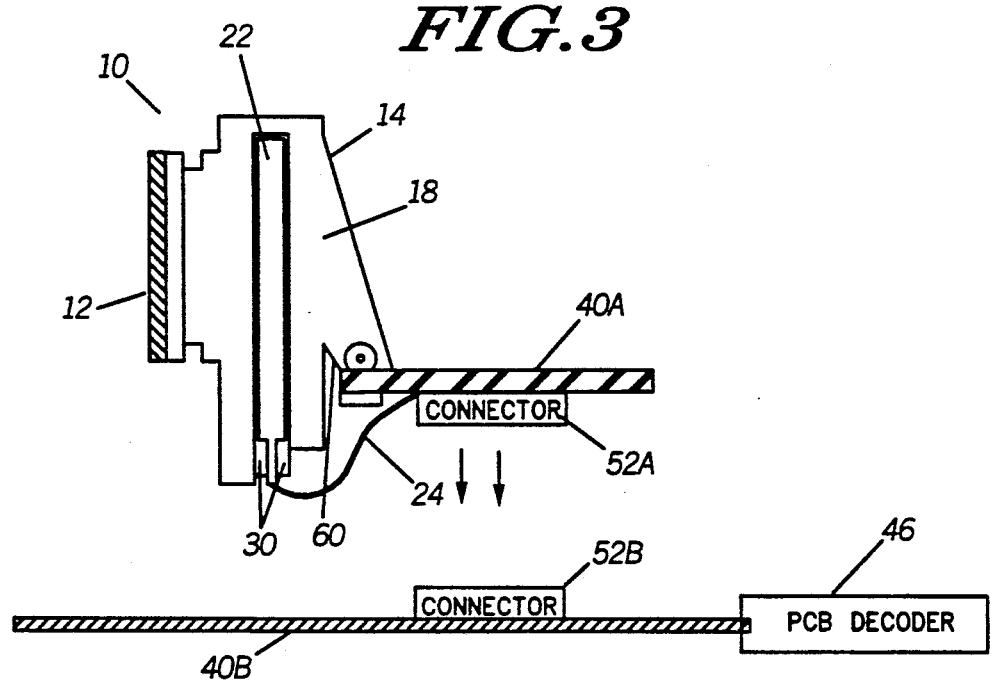
FIG. 3 is an assembled view of the structure illustrated in FIG. 2, slightly modified and incorporating a light ray diagram.

FIG. 3, a slightly modified version of circuit board 40 is illustrated wherein lamps 42 and 44 are mounted on a first portion 40A and decoder 46 is mounted on a second portion 40B. The two portions can then be connected by some convenient means such as connector portions 52A and 52B. This particular embodiment makes the decoder more easily removable for maintenance or change. Also, it is easier to include other electronics on board 40B.

Figure 4:
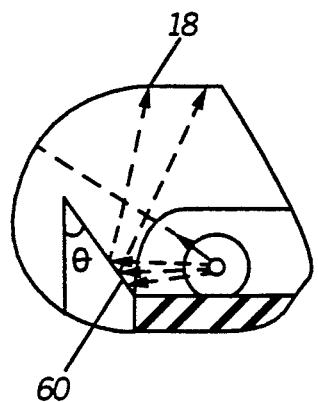
FIG. 4 is an enlarged portion of the light ray diagram of FIG. 3, portions thereof broken away.

FIG. 3 further illustrates a light ray diagram for light emanating from lamps 42 and 44, with FIG. 4 illustrating an enlarged portion thereof. From these diagrams it can be seen that the majority of the light is directed onto the slanted rear surface 14 of light wedge 10. Rear surface 14 reflects the light through LCD 22 contained within slot 16 and onto front viewing surface 12. A slanting light reflecting surface 60 is formed in light wedge 10 by cutting a slot in the wide edge of portion 18. Surface 60 is positioned between slot 16 and openings 32 and 34 so as to reflect light from lamps 42 and 44 back toward rear surface 14 and prevent the light from impinging directly on front viewing surface 12 (see especially FIG. 4). Since virtually all of the light from lamps 42 and 44 is reflected from rear surface 14 toward front viewing surface 12, the light is more uniformly dispersed and hot spots are substantially eliminated. Thus, the additional tasks of painting and the like to diffuse the light is eliminated and the light is more evenly distributed.

Figure 5:
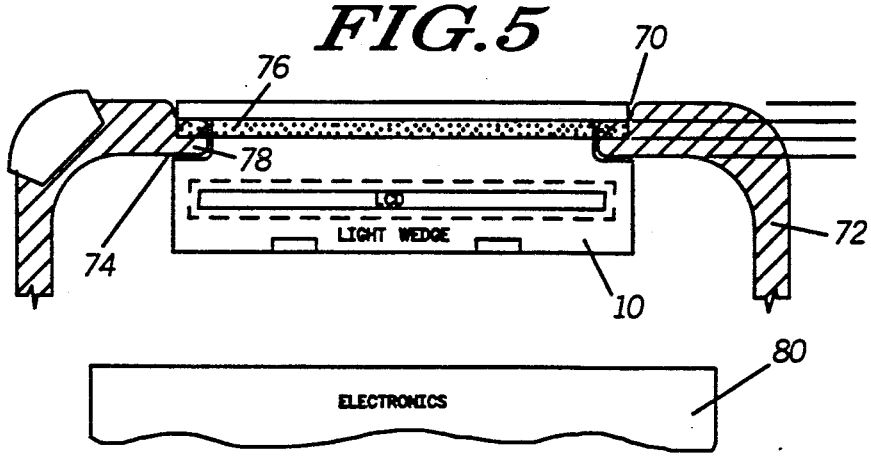
FIG. 5 is a sectional view of the LCD/light wedge module, which is illustrated in FIG. 1, mounted in an electronic device.

Referring to FIG. 5, a sectional view of an electronic device having an LCD/light wedge module mounted therein is illustrated. The LCD/light wedge module is mounted in an LCD display opening 70 of an electronic device housing 72 by means of a mounting groove 74. Mounting groove 74 is formed in light wedge 10 adjacent to and encircling viewing surface 12. A strip of resilient material 76 is positioned in mounting groove 74. Resilient material 76 may be, for example, a shock isolation rubber foam or any other convenient material for absorbing high impact shocks and the like. An edge 78 of housing 72 surrounding LCD display opening 70 is engaged in mounting groove 74 in contact with resilient material 76 so as to fixedly mount the LCD/light wedge module in display opening 70 and to substantially absorb shocks caused by impact, e.g. dropping, hitting, etc. This mounting structure is especially useful in portable electronic devices such as radios and pagers which are highly susceptible to dropping, hitting and other hard use. Resilient material 76 absorbs shock before it can effect the LCD/light wedge module and, in some instances, resilient material 30 sealing LCD 22 in slot 16 may shock mount LCD 22 further against shocks that do reach light wedge 10.

Electronics 80 is mounted in housing 72 in any usual manner and is connected to the LCD/light wedge module for driving LCD 22 as a display. As mentioned above, electronics 80 may be the circuitry for a radio, pager, or any other electronics device utilizing an LCD display.

Thus, an improved LCD/light wedge module is illlustrated and described which is relatively simple to construct and assemble and which substantially eliminates hot spots in the illumination thereof. Also, LCD 22 is sealed in light wedge 10 so as to reduce or eliminate the possibility of dust and dirt entering therein and reducing the efficiency. Further, the LCD/light wedge module is mounted in an electronic device so that shocks and the like are absorbed and cracking or other damage to LCD 22 is reduced or eliminated.

While I have shown and described a specific embodiment of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What I claim is:

1. An LCD/light wedge module comprising:
   a generally box shaped LCD unit having a rectangular cross section with opposed substantially planar surfaces;
   light conducting material having a substantially rectangular planar front viewing surface generally perpendicular to a viewing direction and a rear surface situated at an angle to the viewing direction;
   a central generally box shaped pocket defined by said light conducting material with said generally box shaped LCD unit nestingly positioned therein, said light conducting material being formed to define substantially planar opposing sides of the box shaped pocket generally parallel to the planar viewing surface and to the planar surfaces of said LCD unit, one of the planar opposing sides of the box shaped opening and the rear surface of said light conducting material forming a generally wedge shaped portion of light conducting material having a wide edge and a narrow edge;
   resilient material engaged with said LCD unit to substantially seal the central generally box shaped pocket and to retain the LCD unit therein;
   lamp receiving areas formed in said light conducting material adjacent the wide edge of the wedge shaped portion; and
   lamps positioned in the lamp receiving areas for introducing light into the light conducting material, some of the introduced light being reflected from the rear surface and through the central generally box shaped pocket and the LCD unit positioned therein to substantially uniformly illuminate the planar front viewing surface; and
   a mounting groove formed in the light conducting material adjacent to the planar front viewing surface.

2. An LCD/light wedge module as claimed in claim 1 including in addition a light directing groove with a slanting light reflecting surface formed in the wide edge between the lamp receiving areas and the box shaped opening to prevent light from travelling directly from said lamps to the planar front viewing surface and for directing light from the lamps onto the rear surface of said light conducting material.

3. An LCD/light wedge module as claimed in claim 1 having in addition resilient material positioned in the mounting groove so as to lie between the module and a mounting structure.

4. An electronic device with LCD display comprising:
   a housing with an LCD display opening defined therein and electronics for switching and driving an LCD display;
   an LCD/light wedge module including a generally box shaped LCD unit having a rectangular cross section with opposed substantially planar surfaces, light conducting material having a substantially rectangular planar front viewing surface generally perpendicular to a viewing direction and a rear surface situated at an angle to the viewing direction, a central generally box shaped opening defined by said light conducting material with said generally box shaped LCD unit nestingly positioned therein, said light conducting material being formed to define substantially planar opposing sides of the box shaped opening generally parallel to the planar viewing surface and to the planar surfaces of said LCD unit, one of the planar opposing sides of the box shaped opening and the rear surface of said light conducting material forming a generally wedge shaped portion of light conducting material having a wide edge and a narrow edge, resilient material engaged with said LCD unit to substantially seal the central generally box shaped opening and to retain the LCD unit therein;

lamp receiving areas formed in said light conducting material adjacent the wide edge of the wedge shaped portion; and lamps positioned in the lamp receiving areas for introducing light into the light conducting material, some of the introduced light being reflected from the rear surface and through the central generally box shaped opening and the LCD unit positioned therein to substantially uniformly illuminate the planar front viewing surface, and a mounting groove formed in said light conducting material and having resilient material positioned therein;

said LCD/light wedge being positioned in said housing within the LCD display opening so that edges of said housing are engaged in said mounting groove and in contact with said resilient material positioned in said mounting groove; and means electrically connecting said LCD/light wedge module to the electronics in said housing.

5. An electronic device with LCD display as claimed in claim 4 wherein the LCD/light wedge module includes in addition a light directing groove with a slanting light reflecting surface formed in the wide edge of the wedge shaped portion between the lamp receiving areas and the box shaped opening for directing light from the lamp receiving areas onto the rear surface of the light conducting material and to prevent light from traveling directly from the lamp receiving areas to the planar front viewing surface.

6. An LCD/light wedge module comprising:

light conducting material having a substantially rectangular planar front viewing surface generally perpendicular to a viewing direction and a rear surface situated at an angle to the viewing direction;

a central generally box shaped opening defined by said light conducting material for receiving a generally box shaped LCD unit therein, the light conducting material being formed to define substantially planar opposing sides of the box shaped opening generally parallel to the planar viewing surface; and lamp receiving areas formed in the light conducting material adjacent the rear surface for introducing light into the light conducting material, some of the introduced light being reflected from the rear surface and through the central generally box shaped opening to substantially uniformly illuminate the planar front viewing surface, said one of the planar opposing sides of the box shaped opening and the rear surface of the light conducting material form a generally wedge shaped portion of light conducting material having a wide edge and a narrow edge and the lamp receiving areas are positioned adjacent the wide edge;

a light directing grove with a slanting light reflecting surface formed in the wide edge, between the lamp receiving areas and the box shaped opening for directing light from the lamp receiving areas onto the rear surface of the light conducting material, said light directing grove being formed to prevent light from traveling directly from the lamp receiving areas to the planar front viewing surface and, thereby, substantially reducing hot spots;

a generally box shaped LCD unit nestingly engaged in the central generally box shaped opening in the light conducting material with resilient material engaging the LCD unit adjacent one edge of the LCD unit, said resilient material being positioned to substantially seal the central generally box shaped opening with the LCD unit positioned therein;

a mounting groove formed in the light conducting material adjacent to the planar front viewing surface.

7. An LCD/light wedge module as claimed in claim 6 having in addition resilient material positioned in the mounting groove so as to lie between the module and a mounting structure.

* * * * *